United States Patent Office 3,487,152
Patented Dec. 30, 1969

3,487,152
TABLETS CONTAINING 7 - CHLORO - 2 - METHYLAMINO - 5 - PHENYL - 3H - 1,4 - BENZODIAZEPINE-4-OXIDE AND CONJUGATED ESTROGENIC SUBSTANCES
Jens Thuroe Carstensen, Montvale, N.J., Prabhakar Ranchhordas Sheth, Nanuet, N.Y., and John James Vance, Park Ridge, N.J., assignors to Hoffmann-La Roche Inc., Nutley, N.J., a corporation of New Jersey
No Drawing. Filed Feb. 7, 1967, Ser. No. 614,396
Int. Cl. A61k *17/06, 9/02*
U.S. Cl. 424—240          6 Claims

ABSTRACT OF THE DISCLOSURE

Granulations containing 7-chloro - 2 - methylamino-5-phenyl-3H-1,4-benzodiazepine-4-oxide and granulations containing conjugated estrogenic substances are described. Described also is a method for producing such granulations and using them in producing tablets, each of which contains both active ingredients.

BRIEF SUMMARY OF THE INVENTION

The invention provides a means for incorporating 7-chloro-2-methylamino-5-phenyl - 3H - 1,4 - benzodiazepine-4-oxide and conjugated estrogenic substances into tablets for oral administration to humans. It solves a stability problem which has been found to exist when these active ingredients are embodied in the same dosage form.

The invention involves the formulation of a first granulation comprising 7-chloro-2-methylamino-5-phenyl-3H-1,4-benzodiazepine-4-oxide, a binder, a disintegrant and a filler; the formulation of a second granulation comprising conjugated estrogenic substances, a binder, a disintegrant, a filler and an alkali in an amount sufficient to maintain the pH of said second granulation above about 7.0; the mixing of said first and second granulation with each other; the addition of a tabletting lubricant to the mixture, thus obtained; and the compression of the total mixture into tablets.

The tablets are used as medicaments in the treatment of the symptoms associated with menopause.

DETAILED DESCRIPTION

Therapeutic compositions containing 7-chloro-2-methylamino-5-phenyl-3H-1,4-benzodiazepine-4-oxide and a conjugated estrogenic substance, in combination, are known in the art. These compositions are used in the treatment of the unpleasant symptoms associated with menopause. These symptoms include, for example, flushing, hot flashes, depressed feelings, anxiety states, etc. However, due to the properties of the active ingredients, i.e. 7-chloro-2-methylamino-5-phenyl-3H-1,4-benzodiazepine - 4 - oxide and the conjugated estrogenic substance, difficulties have been encountered in formulating a completely acceptable solid oral dosage form. For example, conjugated estrogens are relatively quite unstable at a pH below about 6.5. As a result of this, it is the practice in the art to incorporate small amounts of a suitable alkali, for example, sodium bicarbonate, into tablet formulations in order to stabilize the estrogenic substance therein. The necessity of stabilizing the estrogen at an alkaline pH creates a problem where the stabilized estrogen is to be used in combination with 7-chloro-2-methylamino-5-phenyl-3H-1,4-benzodiazepine-4-oxide since the latter compound is relatively unstable at a pH above about 6.0.

In its broadest embodiment, the present invention is concerned with pharmaceutical tablets which contain 7-chloro-2-methylamino-5-phenyl - 3H - 1,4 - benzodiazepine-4-oxide and conjugated estrogenic substance as the active ingredients.

In a more specific embodiment, the invention is concerned with tablets containing 7-chloro-2-methylamino-5-phenyl-3H-1,4-benzodiazepine-4-oxide and conjugated estrogenic substance as the active ingredients, each such active ingredient being provided in an environment in which it is relatively quite stable.

It has been found that tablets containing 7-chloro-2-methylamino-5-phenyl-3H-1,4-benzodiazepine-4-oxide and conjugated estrogen can be prepared by the steps of (1) preparing a first granulation containing 7-chloro-2-methylamino-5-phenyl - 3H - 1,4 - benzodiazepine-4-oxide, (2) preparing a second granulation containing the conjugated estrogenic substance, (3) mixing the first granulation and second granulation, (4) adding a tabletting lubricant to the mixture thus obtained and (5) compressing the mixture thus obtained into tablets.

In the preceding paragraphs reference has been made to the use of 7-chloro-2-methylamino-5-phenyl-3H-1,4-benzodiazepine-4-oxide in carrying out the invention. It is to be understood that the term has been and, in the paragraphs to follow, will be used generically to embrace the compound in the form of the free base as well as medicinally acceptable acid addition salts of the free base. The term "medicinally acceptable acid addition salts" is used herein to denote salts of the base with medicinally acceptable acids. These acids include mineral acids, such as, hydrobromic acid, hydrochloric acid, nitric acid, phosphoric acid, etc., as well as organic acids, such as, benzene sulfonic acid, toluene sulfonic acid, acetic acid, citric acid, lactic acid, etc. It is to be understood, therefore, that where, in the present specification, the term "7-chloro-2-methylamino-5-phenyl - 3H - 1,4 - benzodiazepine-4-oxide" is used, such term includes the free base and salts thereof ith a medicinally acceptable acid.

The estrogenic substances that are employed in the practice of this invention are, as indicated heretofore, conjugated estrogenic substances. The term "conjugated estrogenic substances" denotes an amorphous preparation containing the naturally occurring water-soluble conjugated forms of mixed estrogens obtained from the urine of pregnant mares. See "New and Nonofficial Drugs," 1960. The principal estrogen present in conjugated estrogenic substances is sodium estrone sulfate and the total estrogenic potency of the preparation is expressed in terms of an equivalent quantity of sodium estrone sulfate. Furthermore, as used herein, the term "conjugated estrogenic substances" includes also sodium estrone sulfate as well as mixtures of sodium estrone sulfate with naturally occurring mixed estrogens.

It has been indicated heretofore, that in carrying out the present invention, there is prepared a first granulation containing 7-chloro - 2 - methylamino-5-phenyl-3H-1,4-benzodiazepine-4-oxide. In producing such granulation, there is charged into a suitable mixer appropriate quantities of (a) 7-chloro-2-methylamino-5-phenyl-3H-1,4-benzodiazepine-4-oxide, (b) a gelatinized cornstarch, (c) a disintegrant and (d) inert filler. The components are thoroughly admixed. In the preferred practice of the invention, the ingredients are mixed in a Pony mixer for a period of about fifteen minutes. Thereafter, the mixture is milled, for example, through a Fitzmill, equipped with a #1A screen, using knives and operating at medium speed. The milled mixture is then mixed again, following which it is granulated with distilled water. The wet granulate is thereafter passed through a Fitzmill, equipped with a #5 screen, operating at slow speed with knives forward. The milled granulate is then dried at elevated temperature, for example, preferably at a temperature up to about 110° F. When dry, the granulate is passed once again through a Fitzmill, equipped with a #1B screen, operating at medium speed.

The quantities of the various ingredients used in producing the aforementioned first granulation are variable within rather wide limits. For example, the granulation can contain (a) from about 7.5% to about 40.0% by weight of 7-chloro - 2 - methylamino-5-phenyl-3H-1,4-benzodiazepine -4-oxide, (b) from about 3.0% to about 10.0% by weight of gelatinized cornstarch, (c) from about 0.5% to about 40.0% by weight of disintegrant and (d) from about 10.0% to about 60.0% by weight of inert filler. The granulations which are prepared and used in the preferred embodiment, however, contain (a) from about 10.0% to about 25.0% by weight of 7-chloro - 2 - methylamino-5-phenyl-3H-1,4-benzodiazepine-4-oxide, (b) from about 5.0% to about 7.0% by weight of gelatinized cornstarch, (c) from about 25.0% to about 35.0% by weight of disintegrant and (d) from about 35.0% to about 50.0% by weight of the inert filler. In any embodiment of this invention, where a medicinally acceptable acid addition salt of 7-chloro-2-methylamino-5-phenyl - 3H-1,4 - benzodiazepine-4-oxide is used, the quantity of such salt employed should be sufficient to provide the equivalent of from about 7.5% to about 40.0% by weight, and preferably from about 10.0% to about 25.0% by weight, of the free base.

The second granulation, i.e., the granulation containing the estrogenic substance as the active ingredient, is readily prepared. In the preparative method, appropriate quantities of (a) the conjugated estrogen substance, (b) the pH regulating alkali, (c) a gelatinized cornstarch, (d) a disintegrant and (e) an inert filler material are charged into a suitable mixer. In the preferred procedure, the aforementioned ingredients are charged into a Littleford-Lodige Mixer and mixed therein, with chopper blades, for a short period of time. While still mixing, the mixture is granulated by the addition thereto of distilled water. The granulation is then dried, for example, preferably in a fluid bed dryer at a temperature of about 122° F. After drying, the granulation is milled through a Fitzmill, equipped with a #1B screen, operating at medium speed.

The quantities of the various ingredients used in producing the aforesaid second granulation are variable within certain prescribed limits. Thus, for example, the granulation will contain (a) a sufficient quantity of conjugated estrogenic substance to provide the equivalent of from about 0.1% to about 1.5% of sodium estrone sulfate, (b) from about 3.0% to about 10.0% of gelatinized cornstarch, (c) from about 0.5% to about 40.0% by weight of disintegrant, (d) from about 35.0% to about 96.0% by weight of inert filler and (e) a sufficient quantity of alkali to maintain the pH of the granulation above about 7.0. The granulations which are prepared in the preferred practice of the invention, however, contain (a) a sufficient quantity of conjugated estrogenic substance to provide the equivalent of from about 0.25% to about 1.2% by weight of sodium estrone sulfate, (b) from about 4.0% to about 8.0% by weight of gelatinized cornstarch, (c) from about 12.0% to about 20.0% by weight of disintegrant and (d) from about 45.0% to about 65.0% by weight of inert filler material. The presence of from about 0.75% to about 3.0% by weight of alkali will, under normal circumstances, suffice to maintain the granulation at a pH above about 7.0.

The granulations produced as described in the preceding paragraphs, that is, the first granulation containing the benzodiazepine-4-oxide compound as the active ingredient and the second granulation containing the estrogenic substance as the active ingredient, are, in the next step of the preparative method, intimately admixed. A tabletting lubricant is added to, and uniformly distributed throughout, the mixture, following which the total mixture is compressed, by any conventional method, into tablets. The quantity of lubricant which is incorporated into the mixture prior to compressing same into tablets is not particularly critical. Under ordinary circumstances, however, the mixture prior to tabletting will contain from about 0.5% to about 3.0% by weight of the lubricant. Preferably, the mixture to be tabletted will contain from about 1.0% to about 2.0% by weight of the lubricant.

The gelatinized starch which is used in the practice of this invention in producing both the first and the second granulation serves therein as a binder. As the gelatinized starch there can be used a product freshly prepared by cooking a starch, for example, cornstarch, in water or, in the alternative, there can be used a commercially available pregelatinized starch. Pregelatinized starches which are very well suited for use in carrying out this invention are available commercially from a variety of sources under various trade names. Thus, for example, there can be used in the practice of this invention the pregelatinized, modified and stabilized waxy maize starch which is marketed by the National Starch and Chemical Corporation under the trade name "Instant Clearjel" or the staramic starches marketed by A. E. Staley Co. under the trade name "Sta-RX." Furthermore, there can be employed the pregelatinized cornstarch marketed by the Hubinger Company under the trade name "OK Pre-Gel." Other binders, suitable for use, are as follows: the pregelatinized food starch, refined from tapioca, marketed under the trade name "Instant Gel"; the stable modified amylopectin, marketed under the trade name "Kosol"; the low viscosity tapioca dextrin marketed under the trade name "Crystal Gum"; the dextrinized cornstarch marketed under the trade name "Purity Glaze"; and the cold water gelling pregelatinized food grade cornstarch marketed under the trade designation 78–1215. The foregoing binders are all available commercially from National Starch and Chemical Corporation. The binder which is used in the preferred practice of the invention is, however, a pregelatinized starch marketed by Corn Products Company under the trade name "Amijel," particularly "Amijel BO–11."

In general, any compound which is used as a disintegrating agent in conventional pharmaceutical compositions can be used as the disintegrant in the granulations described herein. These include, for example, a starch, such as, cornstarch, potato starch, rice starch, etc.; alginic acid, commercially available as "Kelacid" (Kelso Company); the ion exchange resin, marketed by Rohm and Haas Company under the trade name "Amberlite XE–88." Where alginic acid, e.g. "Kelacid," is used as the disintegrant, such compound can comprise as little as 1% by weight of each granulation. Where "Amberlite XE–88" is employed, this material can comprise as little as 0.5% by weight of each granulation. In the preferred embodiment of the invention, however, cornstarch is employed as the disintegrating agent and it comprises at least about 10% of the weight, for example, from about 10% to about 40% of the weight, of each granulation.

Furthermore, any inert filler which is used in formulating conventional pharmaceutical compositions can be used in the formulation of the herein described granulations. Included among the fillers that can be used are calcium phosphate, e.g., mono-, di- or tri-calcium phosphate; calcium sulfate; microcrystalline cellulose, etc. Preferably, however, lactose is used as the inert filler in formulating the granulations.

Sodium bicarbonate is preferably used to maintain the pH of the estrogen-containing granulation at above about 7.0. However, it will be evident that other weak bases, such as, tribasic sodium phosphate, calcium carbonate, sodium carbonate, potassium bicarbonate, etc. can be used, in lieu of sodium bicarbonate, to adjust and retain the estrogen-containing granulation at a pH of above about 7.0.

As indicated heretofore, tabletting lubricants are added to, and admixed with, the mixture of the two primary granulations prior to the compression of the total mixture into tablets. In the preferred practice of the invention, calcium stearate is used as the lubricant. However, other conventional lubricants, such as, stearic acid, magnesium stearate, talc, etc., can be used.

The quantities of the various ingredients present in the total mixture, i.e., the mixture comprising the first granulation, the second granulation and the tabletting lubricant, prior to its compression into tablets, will vary depending upon the quantities of the said ingredients used in producing the two primary granulations. However, the total mixture from which the preferred tablets of this invention are prepared comprises, in general, the following named ingredients in the quantities hereinafter indicated:

| | Percent by wt. |
|---|---|
| Conjugated estrogen powder | 6.0 to 15 [1] |
| 7-chloro-2-methylamino-5-phenyl-3H-1,4-benzodiazepine-4-oxide | 5.5 to 14 |
| Gelatinized cornstarch (Amijel BO–11) | 5.5 to 6.5 |
| Cornstarch | 20.0 to 27.0 |
| Lactose | 42.0 to 55.0 |
| Sodium bicarbonate | 0.5 to 2.0 |
| Calcium stearate | 1.0 to 1.4 |

[1] Equivalent to about 0.2% to about 0.5% by weight of sodium estrone sulfate powder.

The present invention, however, is particularly designed to provide tablets for oral administration which contain from about 5 mg. to about 25 mg., and preferably from about 5 mg. to about 10 mg. of 7-chloro-2-methylamino - 5 - phenyl - 3H - 1,4 - benzodiazepine - 4 - oxide and from about 0.1 mg. to about 2.5 mg., and preferably from about 0.2 mg. to about 0.4 mg. of conjugated estrogenic substance, measured as sodium estrone sulfate. This is accomplished by compressing into tablets a mixture such as is described in the preceding paragraph. The precise method by which the mixtures are compressed into tablets is not critical. In general, the tabletting operation can be carried out using conventional methods and standard equipment.

The quantities of active medicaments present therein, taken with the needs and requirements of the patient as diagnosed by the prescribing physician, will determine how frequent the tablets of this invention are administered. In the treatment of a normal adult, tablets containing from 5 mg. to 25 mg. of 7-chloro-2-methylamino-5-phenyl-3H-1,4-benzodiazepine-4-oxide and from 0.1 mg. to 2.5 mg. of conjugated estrogenic substance measured as sodium estrone sulfate can be administered up to four times daily. It is to be understood that the dosages mentioned herein are exemplary only and, hence, the disclosure thereof should not be construed as a limitation on the scope or practice of this invention. The dosages can be adjusted by the prescribing physician to satisfy the needs and requirements of particular patients.

For a fuller understanding of the nature and objects of this invention, reference may be had to the following examples which are given merely as further illustrations of the invention and are not to be construed in a limiting sense.

EXAMPLE 1

In this example, the following named ingredients, in the quantities hereinafter indicated, were charged into a Littleford-Lodige mixer.

| | Mg./tablet |
|---|---|
| Conjugated estrogen powder (2% excess) | 6.00 |
| Sodium bicarbonate | 0.55 |
| Pregelatinized cornstarch (Amijel BO–11) | 2.50 |
| Cornstarch | 7.45 |
| Lactose | 25.00 |

These ingredients were mixed in the Littleford-Lodige mixer for a period of about three minutes with chopper blades. Thereafter, 10.0 liters of distilled water were added with the mixer being run with chopper blades during this operation. Mixing time was about fifteen minutes. Subsequently, the mixture was removed from the mixer and about 50% of the weight thereof was placed in a fluid bed dryer basket. This portion of the mixture was dried in the fluid bed dryer for a period of about sixty minutes at a temperature of about 122° F. The remainder of the material was dried by an identical procedure. The dried mixtures were, thereafter, blended and milled through a #1B screen at medium speed. For purposes of subsequent identification, the granulation produced as described in this paragraph will be referred to hereinafter as "Granulation #1."

A second granulation was prepared using the following named ingredients in the quantities hereinafter indicated:

| | Mg./tablet |
|---|---|
| 7-chloro-2-methylamino-5-phenyl-3H-1,4-benzodiazepine-4-oxide | 5.10 |
| Pregelatinized cornstarch [1] | 2.50 |
| Cornstarch | 13.90 |
| Lactose | 20.00 |

[1] Amijel BO–11.

The aforesaid ingredients were charged into a medium size Pony mixer and they were mixed therein for a period of about fifteen minutes. At the end of this time, the mixture was passed through a Fitzmill using knives at medium speed and a #1A screen. The ground mixture was then mixed for a period of about five minutes. The mixture was then granulated by adding 13.5 liters of distilled water, following which it was passed through a Fitzmill #5 screen using slow speed and knives forward. The granulation was then dried overnight at a temperature of about 110° F. Thereafter it was passed through a Fitzmill #2 screen, operating at medium speed. For further identification purposes, the granulation produced as described in this paragraph will be referred to hereinafter as "Granulation #2."

Granulation #1 and Granulation #2 and 1.00 mg./tablet of calcium stearate were charged into a Littleford-Lodige mixer and mixed therein without chopper blades for a period of about 3 minutes. At the end of this period of time the mixture was rolled for a period of about two minutes. Subsequently, the mixture was compressed at a tablet weight of 84 mg. using $^{15}\!/_{64}''$ deep concave punches on a Rotary tablet machine.

There was obtained tablets containing 5 mg. (plus 2% excess) of 7-chloro-2-methylamino-5-phenyl-3H-1,4-benzodiazepine-4-oxide and 6 mg. of conjugated estrogen powder, the latter providing 0.2 mg. (plus 2% excess) of sodium estrone sulfate. These tablets were then sugar coated in conventional fashion.

When stored under normal conditions, the active ingredients of the tablets remained stable.

EXAMPLE 2

In this example, tablets were produced from granulations containing the following named ingredients in the quantities hereinafter indicated.

Granulation #1:

| | Mg./tablet |
|---|---|
| Conjugated estrogen powder | 12.00 |
| Sodium bicarbonate | 1.10 |
| Pregelatinized cornstarch [1] | 2.50 |
| Cornstarch | 5.90 |
| Lactose | 20.00 |

Granulation #2:

| | Mg./tablet |
|---|---|
| 7-chloro-2-methylamino-5-phenyl-3H-1,4-benzodiazepine-4-oxide | 5.10 |
| Pregelatinized cornstarch [1] | 2.50 |
| Cornstarch | 13.90 |
| Lactose | 20.00 |

[1] Amijel BO–11.

Granulation #1 and Granulation #2 were each produced in the same manner as the corresponding granulation was produced in Example 1. Granulation #1 and Granulation #2 were mixed with 1.0 mg./tablet of calcium stearate and the mixture was tabletted as described in the preceding example.

There was thus obtained tablets weighing 84 mg., each containing 5.0 mg. (plus 2% excess) of 7-chloro-2-methylamino - 5 - phenyl - 3H - 1,4-benzodiazepine-4-oxide and 12 mg. of conjugated estrogen powder, the latter providing 0.4 mg. (plus 2% excess) of sodium estrone sulfate. These tablets were then sugar coated in conventional fashion.

When stored under normal conditions, the active ingredients of the tablets remained stable.

Example 3

In this example, granulations were prepared using the following named ingredients in the quantities hereinafter indicated:

Granulation #1:                                      Mg./tablet
   Conjugated estrogen powder _____ 12.00
   Sodium bicarbonate _____ 1.10
   Pregelatinized cornstarch [1] _____ 2.50
   Cornstarch _____ 5.90
   Lactose _____ 20.00

Granulation #2:
   7-chloro-2-methylamino-5-phenyl-3H-1,4-
     benzodiazepine-4-oxide _____ 10.20
   Pregelatinized cornstarch [1] _____ 2.50
   Cornstarch _____ 12.00
   Lactose _____ 16.80

[1] Amijel BO–11.

Granulation #1 and Granulation #2 were produced in the same manner as were Granulations #1 and #2 of Example 1. Granulation #1 and Granulation #2 were mixed with 1.0 mg./tablet of calcium stearate, following which the mixture was tabletted as described in Example 1.

There was thus obtained tablets weighing 84 mg., each containing 10 mg. (plus 2% excess) of 7-chloro-2-methylamino-5-phenyl-3H-1,4-benzodiazepine-4-oxide and 12 mg. of conjugated estrogen powder, the latter providing 0.4 mg. (plus 2% excess) of sodium estrone sulfate. These tablets were then sugar coated in conventional fashion.

When stored under normal conditions, the active ingredients of the tablets remained stable.

We claim:

1. A pharmaceutical compressed tablet for oral administration to women for treatment of menopausal manifestations comprising a stable mixture of:
  (a) a first granulation relatively unstable at a pH above about 6.0 comprising:
    (1) from about 5 mg. to about 25 mg. of a therapeutically active compound selected from the group consisting of 7-chloro-2-methylamino-5-phenyl-3H-1,4-benzodiazepine-4-oxide and a salt thereof with a medicinally acceptable acid, the weight of said therapeutically active member representing from about 7.5 percent to about 40.0 percent by weight of the total weight of said first granulation;
    (2) as a granulation binder, from about 3.0 percent to about 10.0 percent of gelatinized cornstarch;
    (3) from about 0.5 percent to about 40.0 percent by weight of a tablet disintegrant selected from the group consisting of a starch and alginic acid;
    (4) from about 10.0 percent to about 60.0 percent by weight of an inert filler selected from the group consisting of lactose, microcrystalline cellulose, calcium sulfate and a calcium phosphate salt; and
  (b) a second granulation relatively unstable at a pH below about 6.5 comprising:
    (1) a quantity of conjugated estrogenic substance sufficient to provide from about 0.1 mg. to about 2.5 mg. sodium estrone sulfate;
    (2) as a granulation binder, from about 3.0 percent to about 10.0 percent of gelatinized cornstarch;
    (3) from about 0.5 percent to about 40.0 percent by weight of a tablet disintegrant selected from the group consisting of a starch and alginic acid;
    (4) from about 35.0 percent to about 96.0 percent by weight of an inert filler selected from the group consisting of lactose, microcrystalline cellulose, calcium sulfate and a calcium phosphate salt;
    (5) a quantity of an alkaline substance selected from the group consisting of sodium, potassium or calcium carbonates or bicarbonates sufficient to maintain said second granulation at a pH above about 7.0.

2. The pharmaceutical compressed tablet according to claim 1 wherein therein there is also present from about 0.5 percent to about 3.0 percent by weight of a lubricant.

3. The pharmaceutical compressed tablet according to claim 1 wherein there is present in said first granulation:
  (1) from about 5 mg. to about 10 mg. of said therapeutically active compound;
  (2) from about 5.0 percent to about 7.0 percent by weight of said gelatinized cornstarch;
  (3) from about 25.0 percent to about 35.0 percent by weight of said tablet disintegrant; and
  (4) from about 35.0 percent to about 50.0 percent by weight of said inert filler and wherein there is present in said second granulation:
  (1) a sufficient quantity of said estrogenic substance to provide from about 0.2 mg. to about 0.4 mg. of sodium estrone sulfate;
  (2) from about 4.0 percent to about 8.0 percent by weight of said gelatinized cornstarch;
  (3) from about 12.0 percent to about 20.0 percent by weight of said tablet disintegrant;
  (4) from about 45.0 percent to about 65.0 percent by weight of said inert filler; and
  (5) from about 0.75 percent to about 3.0 percent by weight of said alkaline substance.

4. The pharmaceutical compressed tablet in accordance with claim 3 wherein both said first and second granulations said tablet disintegrant is cornstarch and said inert filler is lactose, and in said second granulation said alkaline substance is sodium bicarbonate.

5. The pharmaceutical compressed tablet in accordance with claim 3 wherein there is also present from about 1.0 percent to about 2.0 percent by weight of a lubricant.

6. The pharmaceutical compressed tablet in accordance with claim 5 wherein said lubricant is calcium stearate.

References Cited

UNITED STATES PATENTS

| | | | |
|---|---|---|---|
| 2,834,712 | 5/1958 | Beall et al. | 424—240 |
| 2,887,436 | 5/1959 | Klioze et al. | 424—20 |
| 3,034,911 | 5/1962 | McKee et al. | 106—210 |
| 3,175,948 | 3/1965 | Koff et al. | 424—201 |
| 3,181,998 | 5/1965 | Kanig | 424—111 |

OTHER REFERENCES

Little et al.: "Tablet Making," 2nd ed. (1963), pp. 47–49, 110–115, Northern Pub. Co., Liverpool, England.

"Menrium" (Hoffmann La Roche Inc.) Reg. Trademark No. 776,448, registered Sept. 8, 1964, for: "Preparations for Treatment of Menopausal Manifestations," (and specimen label).

S. K. ROSE, Primary Examiner

U.S. Cl. X.R.

424—244, 361, 362